(12) United States Patent
Zewail et al.

(10) Patent No.: US 11,818,731 B2
(45) Date of Patent: Nov. 14, 2023

(54) HANDLING OF A PHYSICAL DOWNLINK SHARED CHANNEL OVERLAPPING WITH A SEMI-STATIC SYMBOL

(71) Applicant: QUALCOMM Incorporated, San Diego, CA (US)

(72) Inventors: Ahmed Abdelaziz Ibrahim Abdelaziz Zewail, San Diego, CA (US); Mostafa Khoshnevisan, San Diego, CA (US); Jing Sun, San Diego, CA (US); Xiaoxia Zhang, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,834

(22) Filed: Aug. 31, 2022

(65) Prior Publication Data
US 2023/0134648 A1    May 4, 2023

Related U.S. Application Data

(60) Provisional application No. 63/263,486, filed on Nov. 3, 2021.

(51) Int. Cl.
*H04W 72/12* (2009.01)
*H04W 72/23* (2023.01)

(52) U.S. Cl.
CPC .................................. *H04W 72/23* (2023.01)

(58) Field of Classification Search
CPC .................................................. H04W 72/1289

USPC ......................................................... 370/329
See application file for complete search history.

(56) References Cited

U.S. PATENT DOCUMENTS

| | | | |
|---|---|---|---|
| 2020/0205150 A1* | 6/2020 | Cheng | H04W 72/0413 |
| 2021/0136802 A1* | 5/2021 | Cirik | H04L 5/0044 |
| 2022/0030620 A1* | 1/2022 | Cirik | H04W 72/14 |
| 2022/0039072 A1* | 2/2022 | Babaei | H04W 72/042 |
| 2022/0183038 A1* | 6/2022 | Saber | H04W 72/1273 |
| 2022/0217694 A1* | 7/2022 | Kim | H04L 5/0053 |
| 2022/0256572 A1* | 8/2022 | Kim | H04L 1/1854 |

OTHER PUBLICATIONS

CATT: "Discussion on Cancellation of Semi-Static Transmission Due to Dynamic Transmission", 3GPP TSG RAN WG1 Meeting #106-e, R1-2106928, 3rd Generation Partnership Project, Mobile Competence Centre, 650, Route Des Lucioles, F-06921 Sophia-Antipolis Cedex, France , vol. RAN WG1, No. e-Meeting, Aug. 16, 2021-Aug. 27, 2021, Aug. 7, 2021, pp. 1-4, XP052038101, Section 2, Figure 1.

(Continued)

*Primary Examiner* — Peter G Solinsky
(74) *Attorney, Agent, or Firm* — Harrity & Harrity, LLP

(57) ABSTRACT

Various aspects of the present disclosure generally relate to wireless communication. In some aspects, a network node may receive downlink control information scheduling, for a set of symbols of a slot, a plurality of physical downlink shared channels and associated intra-slot repetitions. The network node may communicate on the set of symbols of the slot, wherein the plurality of physical downlink shared channels and associated intra-slot repetitions do not collide with one or more semi-static uplink symbols of the set of symbols. Numerous other aspects are described.

26 Claims, 11 Drawing Sheets

(56) References Cited

OTHER PUBLICATIONS

International Search Report and Written Opinion—PCT/US2022/076946—ISA/EPO—dated Jan. 5, 2023.
SAMSUNG: "Enhancements on Multi-TRP/Panel Transmission", 3GPP TSG RAN WG1 Meeting #98bis, R1-1910493, NCJT, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019, XP051808213, 17 Pages, Sections 2.1, 5.1, 5.2.

\* cited by examiner

HANDLING OF A PHYSICAL DOWNLINK SHARED CHANNEL OVERLAPPING WITH A SEMI-STATIC SYMBOL

CROSS-REFERENCE TO RELATED APPLICATION

This Patent Application claims priority to U.S. Provisional Patent Application No. 63/263,486, filed on Nov. 3, 2021, entitled "HANDLING OF A PHYSICAL DOWNLINK SHARED CHANNEL OVERLAPPING WITH A SEMI-STATIC SYMBOL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for handling of a physical downlink shared channel overlapping with a semi-static symbol.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving downlink control information scheduling, for a set of symbols of a slot, a plurality of physical downlink shared channels and associated intra-slot repetitions. The method may include communicating on the set of symbols of the slot, wherein the plurality of physical downlink shared channels and associated intra-slot repetitions do not collide with one or more semi-static uplink symbols of the set of symbols.

Some aspects described herein relate to a method of wireless communication performed by a base station. The method may include transmitting, to a network node, downlink control information scheduling, for a set of symbols of a slot, a plurality of physical downlink shared channels and associated intra-slot repetitions. The method may include communicating, with the network node and on the set of symbols of the slot, wherein the plurality of physical downlink shared channels and associated intra-slot repetitions do not collide with one or more semi-static uplink symbols of the set of symbols.

Some aspects described herein relate to a network node for wireless communication. The network node may include a memory and one or more processors coupled to the memory. The one or more processors may be configured to receive downlink control information scheduling, for a set of symbols of a slot, a plurality of physical downlink shared channels and associated intra-slot repetitions. The one or more processors may be configured to communicate on the set of symbols of the slot, wherein the plurality of physical downlink shared channels and associated intra-slot repetitions do not collide with one or more semi-static uplink symbols of the set of symbols.

Some aspects described herein relate to a base station for wireless communication. The base station may include a memory and one or more processors coupled to the memory. The one or more processors may be configured to transmit, to a network node, downlink control information scheduling, for a set of symbols of a slot, a plurality of physical downlink shared channels and associated intra-slot repetitions. The one or more processors may be configured to communicate, with the network node and on the set of symbols of the slot, wherein the plurality of physical downlink shared channels and associated intra-slot repetitions do not collide with one or more semi-static uplink symbols of the set of symbols.

Some aspects described herein relate to a non-transitory computer-readable medium that stores a set of instructions for wireless communication by a network node. The set of instructions, when executed by one or more processors of the network node, may cause the network node to receive downlink control information scheduling, for a set of symbols of a slot, a plurality of physical downlink shared channels and associated intra-slot repetitions. The set of instructions, when executed by one or more processors of the network node, may cause the network node to communicate on the set of symbols of the slot, wherein the plurality of physical downlink shared channels and associated intra-slot repetitions do not collide with one or more semi-static uplink symbols of the set of symbols.

Some aspects described herein relate to a non-transitory computer-readable medium that stores a set of instructions for wireless communication by a base station. The set of instructions, when executed by one or more processors of the base station, may cause the base station to transmit, to a network node, downlink control information scheduling, for a set of symbols of a slot, a plurality of physical downlink shared channels and associated intra-slot repetitions. The set of instructions, when executed by one or more processors of the base station, may cause the network node to communicate, with the base station and on the set of symbols of the slot, wherein the plurality of physical downlink shared channels and associated intra-slot repetitions do not collide with one or more semi-static uplink symbols of the set of symbols.

Some aspects described herein relate to an apparatus for wireless communication. The apparatus may include means for receiving downlink control information scheduling, for a set of symbols of a slot, a plurality of physical downlink shared channels and associated intra-slot repetitions. The apparatus may include means for communicating on the set of symbols of the slot, wherein the plurality of physical downlink shared channels and associated intra-slot repetitions do not collide with one or more semi-static uplink symbols of the set of symbols.

Some aspects described herein relate to an apparatus for wireless communication. The apparatus may include means for transmitting, to a network node, downlink control information scheduling, for a set of symbols of a slot, a plurality of physical downlink shared channels and associated intra-slot repetitions. The apparatus may include means for communicating, with the network node and on the set of symbols of the slot, wherein the plurality of physical downlink shared channels and associated intra-slot repetitions do not collide with one or more semi-static uplink symbols of the set of symbols.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
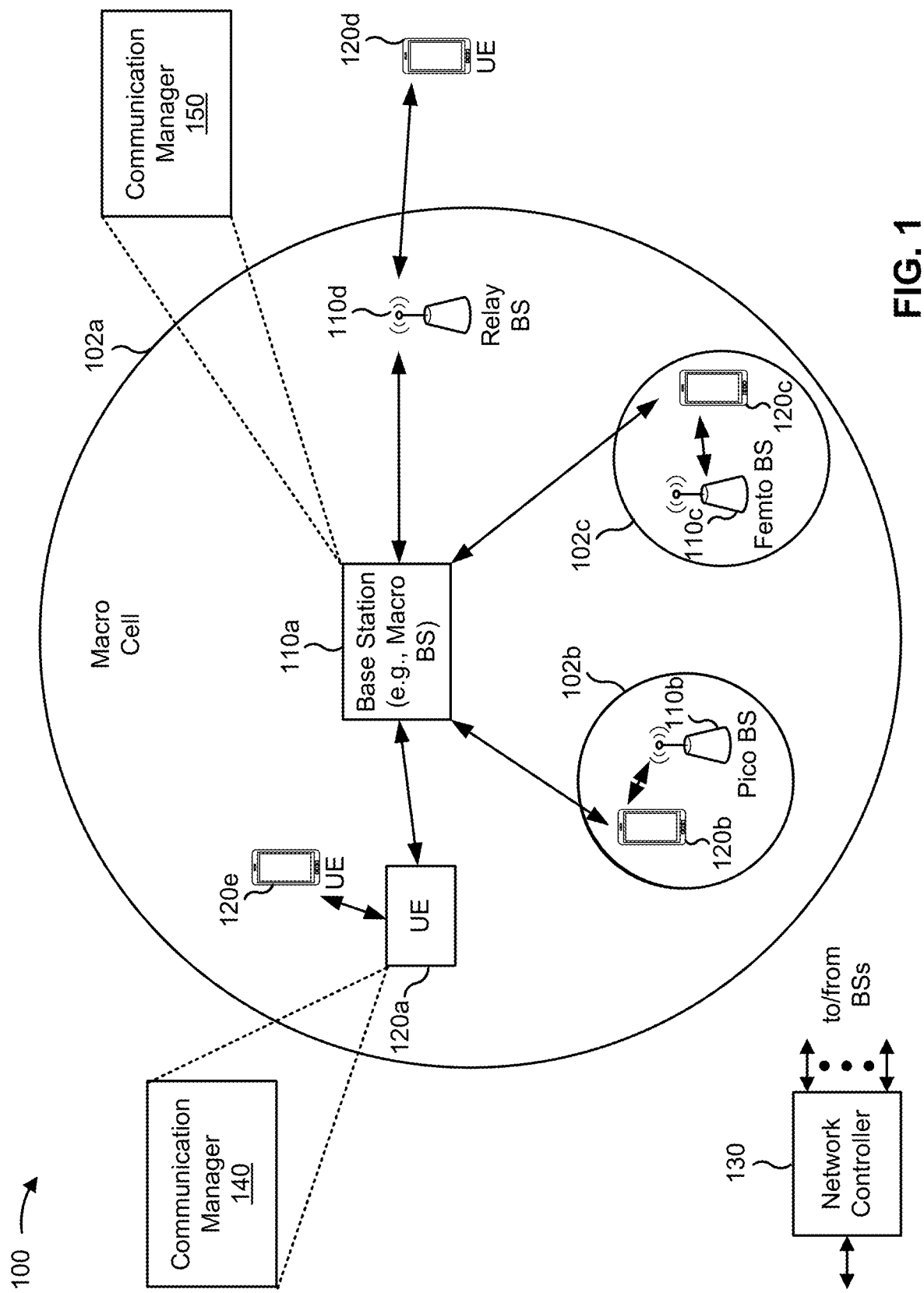
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, to a UE in communication therewith, or to one or more units of a disaggregated base station (such as one or more central units or control units (CUs), one or more distributed units (DUs), one or more remote units or radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 (e.g., a network node) may include a communication manager 140. As described in more detail elsewhere herein, the communication manager 140 may receive downlink control information scheduling, for a set of symbols of a slot, a plurality of physical downlink shared channels and associated intra-slot repetitions; and communicate on the set of symbols of the slot, wherein the plurality of physical downlink shared channels and associated intra-slot repetitions do not collide with one or more semi-static uplink symbols of the set of symbols. Additionally, or alternatively, the communication manager 140 may perform one or more other operations described herein.

In some aspects, the base station 110 (e.g., another network node or a network entity) may include a communication manager 150. As described in more detail elsewhere herein, the communication manager 150 may transmit, to a network node (e.g., the UE 120), downlink control information scheduling, for a set of symbols of a slot, a plurality of physical downlink shared channels and associated intra-slot repetitions; and communicate, with the network node and on the set of symbols of the slot, wherein the plurality of physical downlink shared channels and associated intra-slot repetitions do not collide with one or more semi-static uplink symbols of the set of symbols. Additionally, or alternatively, the communication manager 150 may perform one or more other operations described herein.

As indicated above, FIG. 1 is provided as an example. Other examples may differ from what is described with regard to FIG. 1.

Figure 2:
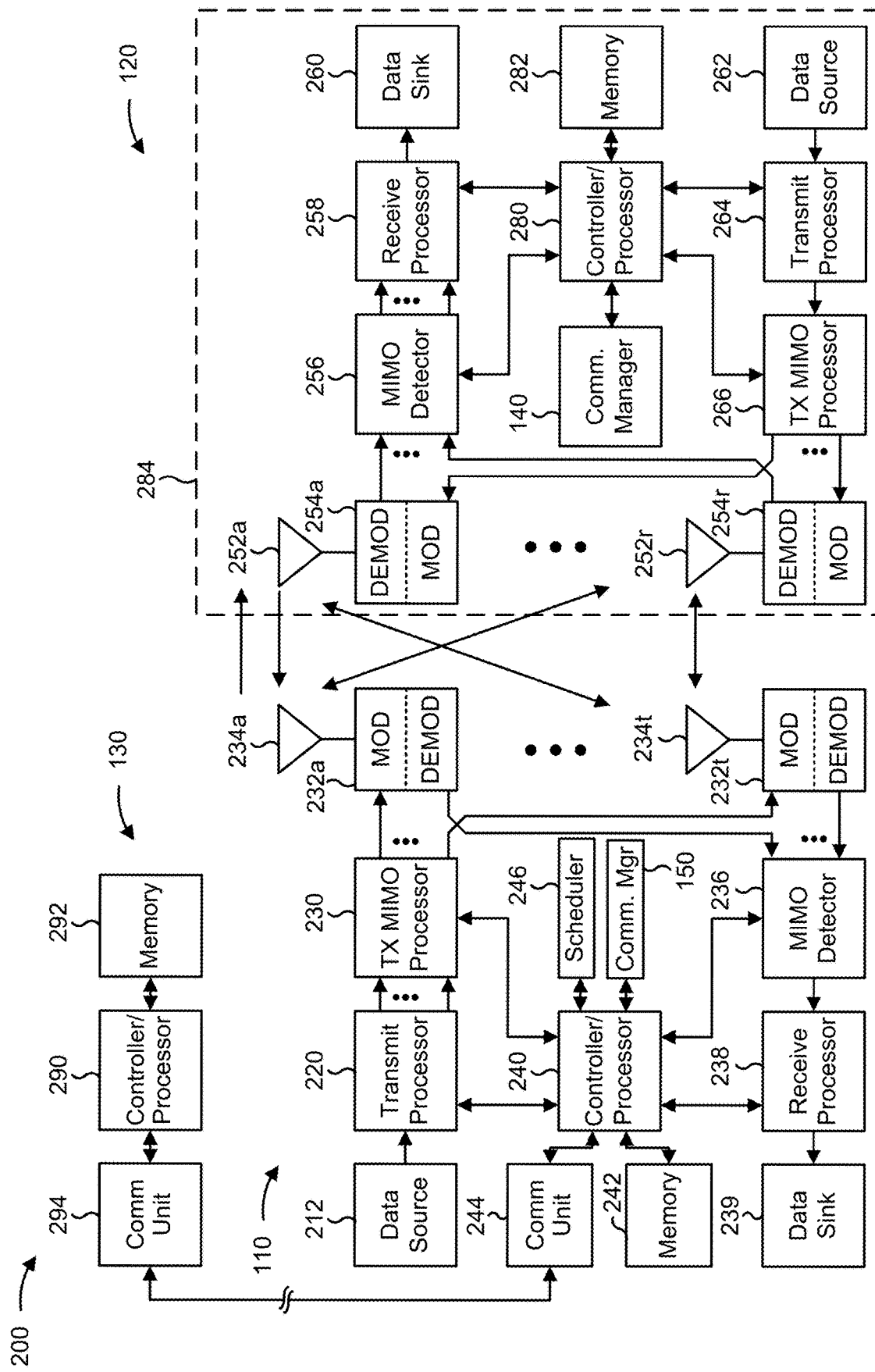
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with handling of a physical downlink shared channel (PDSCH) overlapping with a semi-static uplink symbol, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a network node (e.g., the UE 120) includes means for receiving downlink control information scheduling, for a set of symbols of a slot, a plurality of physical downlink shared channels and associated intra-slot repetitions; and/or means for communicating on the set of symbols of the slot, wherein the plurality of physical downlink shared channels and associated intra-slot repetitions do not collide with one or more semi-static uplink symbols of the set of symbols. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 (e.g., another network node) includes means for transmitting, to a network node (e.g., the UE 120), downlink control information scheduling, for a set of symbols of a slot, a plurality of physical downlink shared channels and associated intra-slot repetitions; and/or means for communicating, with the network node and on the set of symbols of the slot, wherein the plurality of physical downlink shared channels and associated intra-slot repetitions do not collide with one or more semi-static uplink symbols of the set of symbols. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
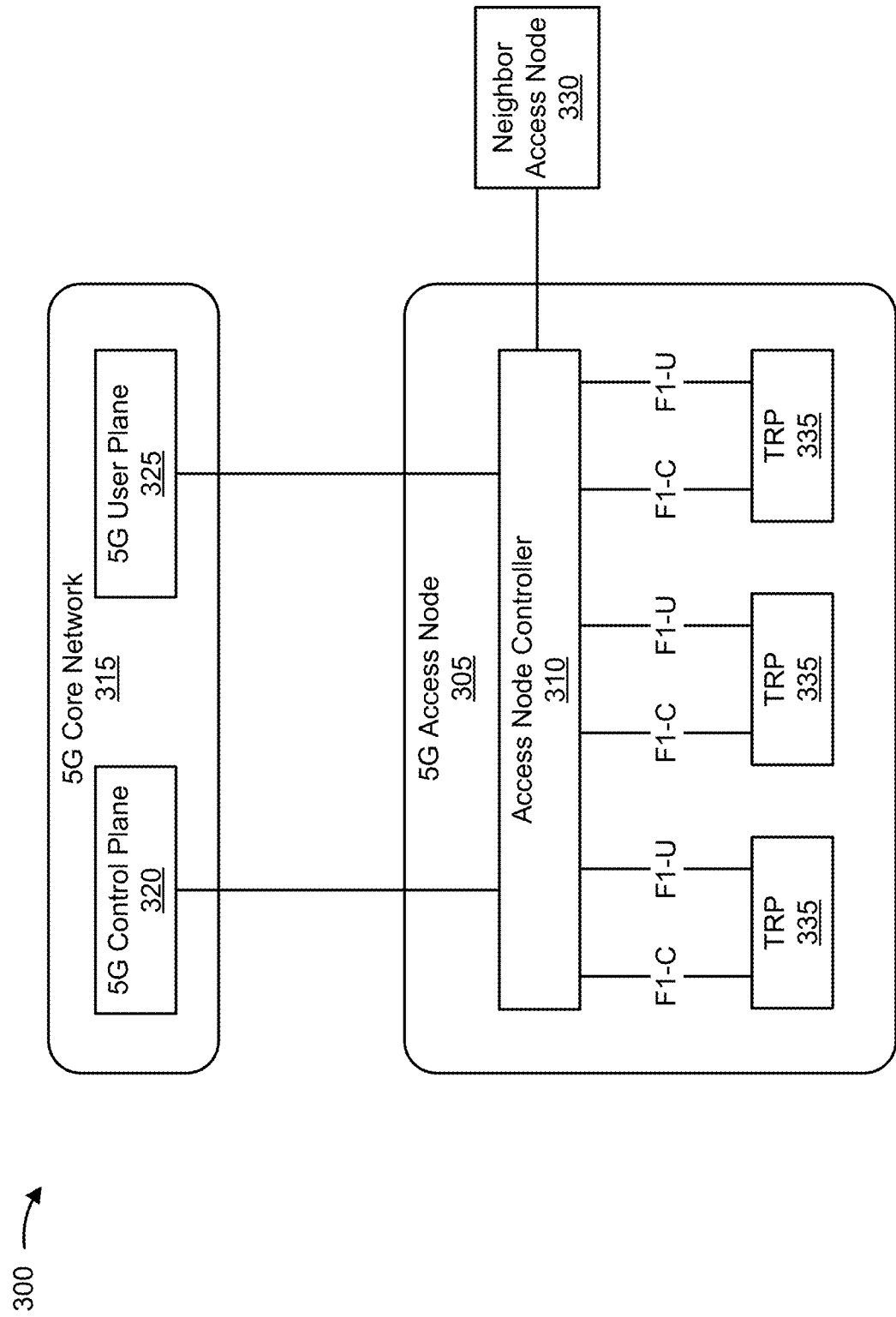
FIG. 3 is a diagram illustrating an example of logical architecture of a distributed radio access network, in accordance with the present disclosure.

FIG. 3 illustrates an example logical architecture of a distributed RAN 300, in accordance with the present disclosure.

A 5G access node 305 may include an access node controller 310. The access node controller 310 may be a CU of the distributed RAN 300. A backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a DU of the distributed RAN 300. A TRP 335 may correspond to a base station 110 described above in connection with FIG. 1. For example, different TRPs 335 may be included in different base stations 110. Additionally, or alternatively, multiple TRPs 335 may be included in a single base station 110. A base station 110 may include a CU (e.g., access node controller 310) and/or one or more DUs (e.g., one or more TRPs 335). In some cases, a TRP 335 may be referred to as a cell, a panel, an antenna array, or an array. A deployment with multiple TRPs 335 may be referred to as a "multi-TRP" or an "mTRP" deployment.

A TRP 335 may be connected to a single access node controller 310 or to multiple access node controllers 310. A dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

Multiple TRPs 335 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). A TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
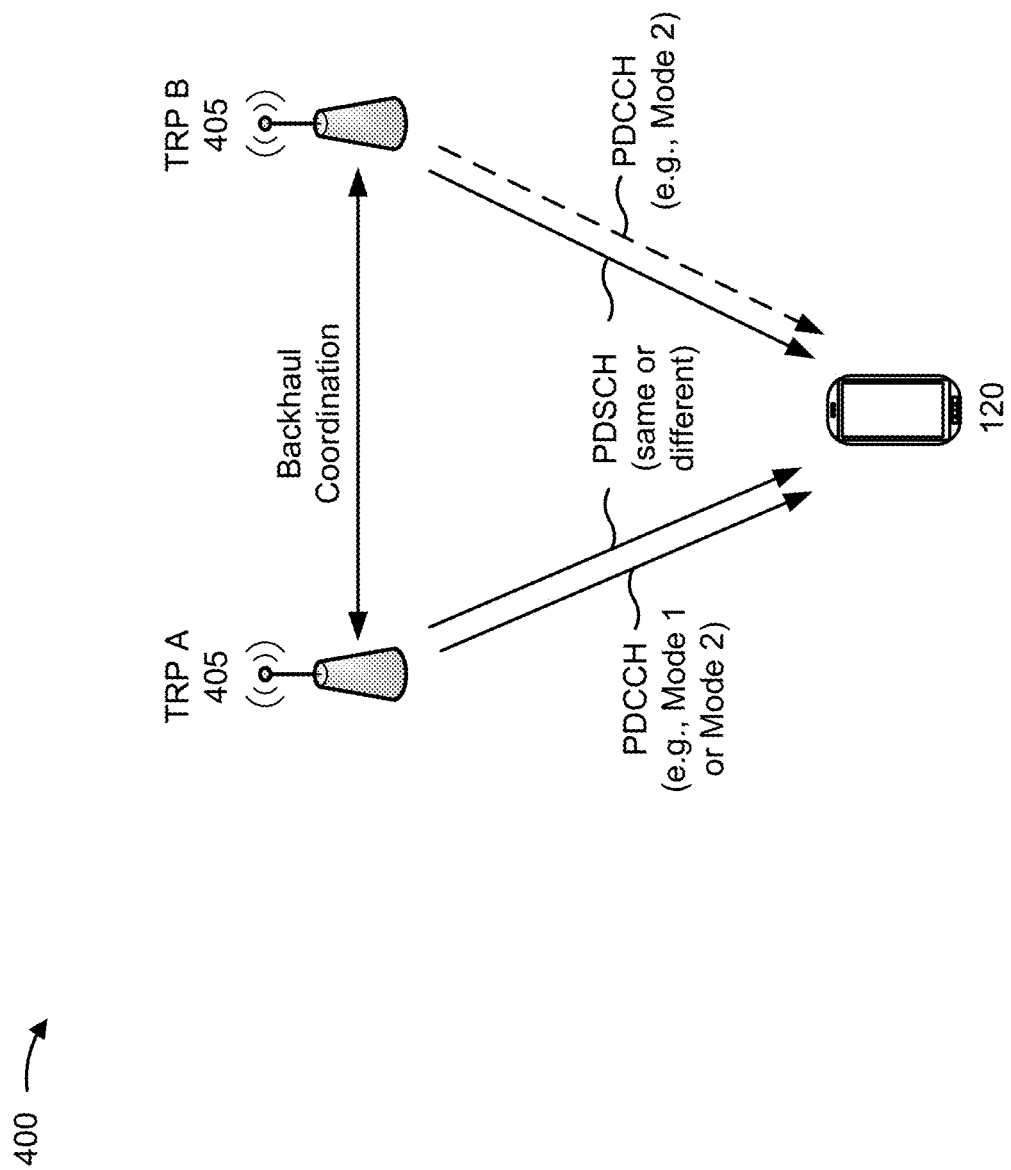
FIG. 4 is a diagram illustrating an example of multi-transmit receive point (TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different DMRS ports, and/or different layers (e.g., of a multi-layer communication).

Ina first multi-TRP transmission mode (e.g., Mode 1), a single physical downlink control channel (PDCCH) may be used to schedule downlink data communications for a single PDSCH. In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. A TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state, and the TCI field of the second DCI indicates the second TCI state).

As indicated above, FIG. 4 is provided as an example. Other examples may differ from what is described with respect to FIG. 4.

As described above, DCI may include information associated with scheduling a communication in a multi-TRP deployment, such as a PDSCH communication or a physical uplink shared channel (PUSCH) communication, among other examples. For example, a single DCI may schedule a plurality of PDSCH transmissions to a single UE in a multi-TRP deployment. Although the DCI may not schedule each PDSCH communication to collide with an uplink symbol, the DCI may schedule one or more PDSCH communications that collide with an uplink symbol. A collision between a scheduled PDSCH and an uplink symbol may occur when the PDSCH is scheduled for transmission during a symbol that is defined for the UE as an uplink symbol for the UE to use for transmission. When a PDSCH, scheduled by the DCI, collides with uplink symbols, the UE may not receive the PDSCH. The uplink symbols may be specified by a configuration message, such as a tdd-UL-DL-ConfigurationCommon configuration message or a tdd-UL-DL-ConfigurationDedicated configuration message.

In another example, a UE may receive DCI scheduling multiple PUSCH communications for the UE. Although the DCI may not schedule each PUSCH communication to collide with a downlink symbol, the DCI may schedule one or more PUSCH communications that collide with a downlink symbol. A collision between a scheduled PUSCH and a downlink symbol may occur when the PUSCH is scheduled for transmission during a symbol that is defined for the UE as a downlink symbol for the UE to use for reception from a TRP. When a PUSCH, scheduled by the DCI, collides with downlink symbols, the UE may not transmit the PUSCH. The downlink symbols may be specified by a configuration message, such as a tdd-UL-DL-ConfigurationCommon configuration message or a tdd-UL-DL-ConfigurationDedicated configuration message.

For example, PDSCH or PUSCH, the UE may have an associated hybrid automatic repeat request (HARQ) process number that the UE and a base station may use for reliability and retransmission signaling. When the UE drops a PDSCH (e.g., the UE does not receive the PDSCH) or a PUSCH (e.g., the UE does not transmit the PUSCH) as a result of a collision with an uplink symbol or a downlink symbol, respectively, the UE may skip incrementing a HARQ process number. In other words, the UE may only apply HARQ process numbers to valid PDSCHs or PUSCHs that are not skipped as a result of a collision.

Figure 5:
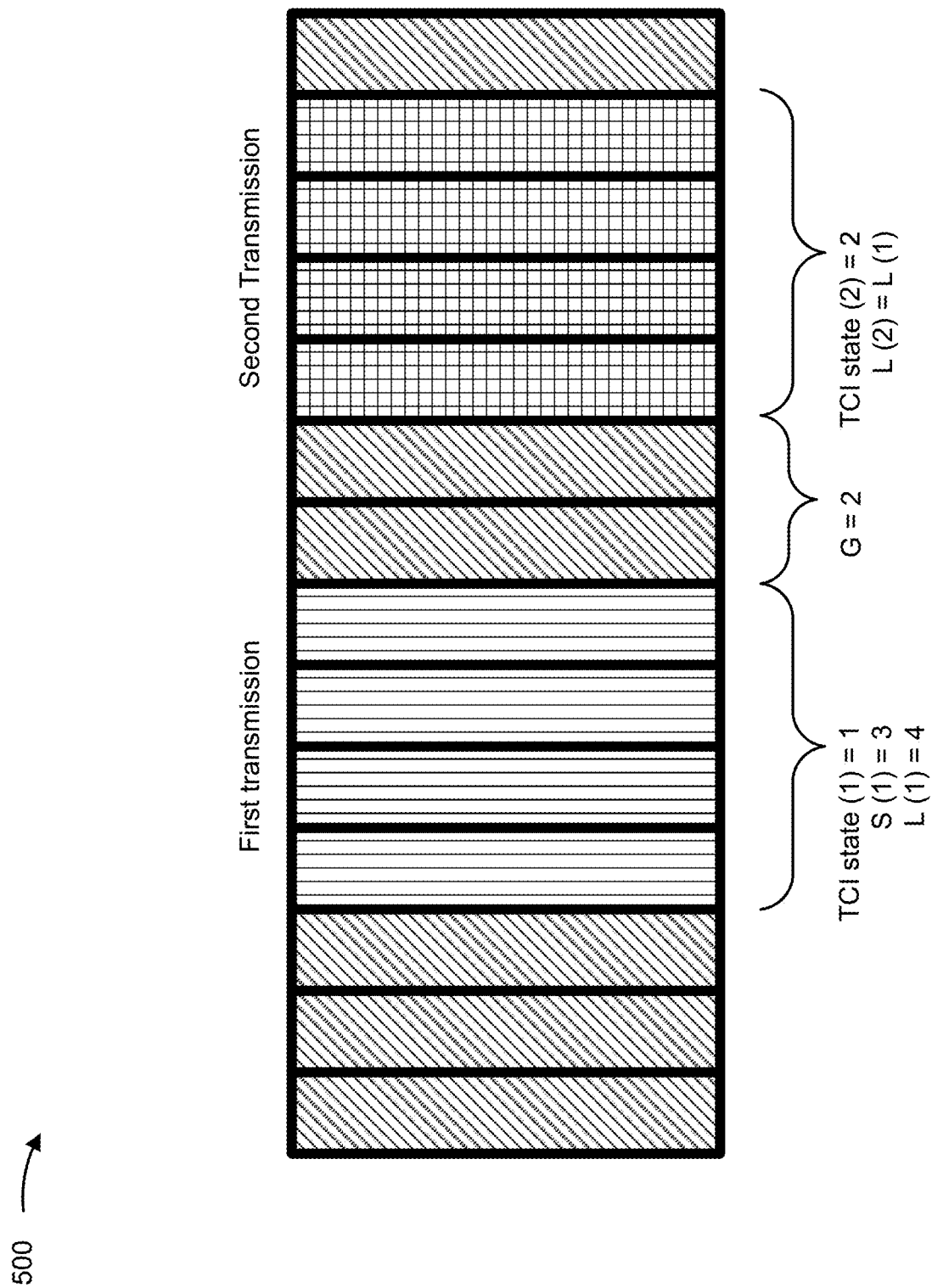
FIG. 5 is a diagram illustrating an example of multi-TRP multi-physical downlink shared channel (PDSCH) transmission with intra-slot repetition, in accordance with the present disclosure.

FIG. 5 is a diagram illustrating an example 500 of multi-TRP multi-PDSCH transmission with intra-slot repetition, in accordance with the present disclosure.

As shown in FIG. 5, a set of transmissions may occur across a set of symbols of a slot. For example, when intra-slot time division multiplexing (TDM) is enabled, a TRP may transmit multiple repetitions of a PDSCH within a single slot. In this case, a first instance of transmission of the PDSCH is termed a "first repetition" and a second instance of transmission of the PDSCH is termed a "second repetition."

A first network node (e.g., a TRP) may transmit two repetitions of the PDSCH to a second network node (e.g., a UE) based at least in part on control information (e.g., DCI) including a TCI field that indicates two TCI states. For example, a network node (e.g., the first network node or the second network node) may receive a TCI field indicating a first TCI state "1" and a second TCI state "2." In this case, the network node may interpret a time domain resource allocation (TDRA) field of the control information as identifying a start and length indicator value (SLIV) for the first repetition of the PDSCH using the first TCI state. For example, the network node may identify a starting symbol (S) for the first repetition of the PDSCH as symbol 3 (e.g., with the sequentially first symbol being indexed as symbol 0) and a length (L) for the first repetition of the PDSCH as 4 symbols, as shown. In this case, the network node may identify the second repetition as having the same length as the first repetition (e.g., 4 symbols, as shown). A gap between the first repetition and the second repetition may be configured via signaling separate from the control information scheduling the PDSCH repetitions. For example, the network node may receive radio resource control (RRC) signaling indicating a gap (G) of 2 symbols between an end of the first repetition and a start of the second repetition, as shown.

The TDRA field, which the network node uses to identify a SLIV for a repetition of the PDSCH, is interpretable using a TDRA table. For a single PDSCH grant, a scheduling entity (e.g., a CU of a base station) may configure the TDRA table for one or more network nodes to ensure that there is no overlap between repetitions of a scheduled PDSCH and uplink symbols (e.g., which may be semi-statically configured and termed "semi-static uplink symbols"). A conflict between a dynamic PDSCH with a semi-static uplink symbol may be treated as an error case that the scheduling entity is to avoid. However, when the scheduling entity is to provide a multi-PDSCH grant, a TDRA row of a TDRA table may schedule up to 8 PDSCHs with TDM repetitions. As a result, the scheduling entity may have up to 16 SLIVs that are not to overlap with semi-static uplink symbols. Enforcing such a requirement may limit network scheduling flexibility excessively, thereby resulting in reduced throughput and poor network performance.

As indicated above, FIG. 5 is provided as an example. Other examples may differ from what is described with respect to FIG. 5.

Figure 6:
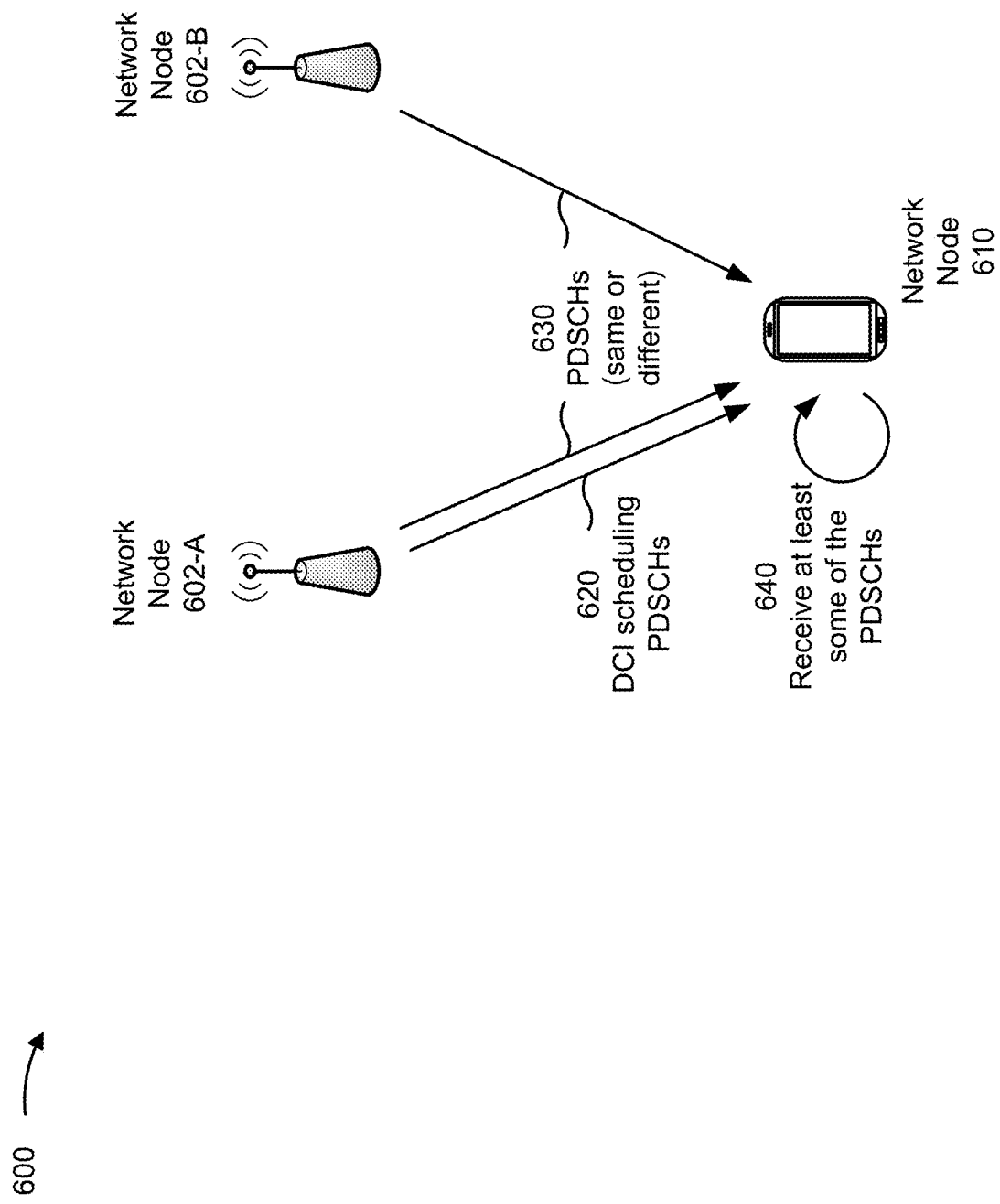
FIG. 6 is a diagram illustrating an example associated with handling of a PDSCH overlapping with a semi-static uplink symbol, in accordance with the present disclosure.

FIG. 6 is a diagram illustrating an example 600 associated with handling of a PDSCH overlapping with a semi-static uplink symbol, in accordance with the present disclosure. As shown in FIG. 6, example 600 includes communication between network nodes 602-A and 602-B (e.g., which may be TRPs or DUs of a base station and associated with an access node controller (ANC) or CU of a base station) and a network node 610 (e.g., which may be a UE 120). In some aspects, the network nodes 602 may correspond to one or more base stations 110). In some aspects, network nodes 602-A and 602-B and network node 610 may be included in a wireless network, such as wireless network 100.

As further shown in FIG. 6, and by reference number 620, network node 610 may receive control information scheduling PDSCHs. For example, network node 610 may receive DCI scheduling a plurality of PDSCHs and associated intra-slot repetitions of the plurality of PDSCHs. In other words, network node 610 may receive DCI scheduling a first and second repetition of a first PDSCH and scheduling a first and second repetition of a second PDSCH. Additionally, or alternatively, network node 610 may receive DCI scheduling additional quantities of repetitions or additional quantities of PDSCHs, among other examples. In some aspects, network node 610 may receive DCI including a TDRA field indicating a PDSCH mapping type for PDSCHs of a PDSCH grant (e.g., a multi-PDSCH grant) in the DCI. For example, network node 610 may receive information identifying mapping types corresponding to each PDSCH of the PDSCH grant. In this case, PDSCHs of the PDSCH grant may have different mapping types, the same mapping type, or a combination of different mapping types and the same mapping type.

In some aspects, network node 610 may receive control information associated with semi-statically configuring communication with network nodes 602-A and 602-B. For example, network node 610 may receive RRC signaling configuring a gap between repetitions of a PDSCH (e.g., which is signaled via DCI). Additionally, or alternatively, network node 610 may receive first control information configuring repetitions of the PDSCH and second control information activating the repetitions of the PDSCH. Additionally, or alternatively, network node 610 may receive control information configuring a directionality of symbols within a slot. For example, network node 610 may receive semi-static signaling (e.g., via RRC) indicating whether a symbol is an uplink symbol, a downlink symbol, or a flexible symbol (e.g., a symbol that can be flexibly used for downlink or uplink).

In some aspects, network node 610 may determine a PDSCH mapping type for a PDSCH grant in the DCI (e.g., a multi-PDSCH grant). For example, network node 610 may determine a PDSCH mapping type for a first repetition of a PDSCH and for a second repetition of a PDSCH based at least in part on a TDRA table. In some aspects, network node 610 may apply PDSCH mapping type-B to each repetition of the PDSCH based at least in part on PDSCH mapping type-B being defined for each SLIV of an indicated TDRA row of a TDRA table. Additionally, or alternatively, network node 610 may apply PDSCH mapping type-B to each repetition of the PDSCH even when a SLIV of an indicated TDRA row of a TDRA table is associated with a different PDSCH mapping type. In this way, network node 610 may reuse a TDRA table, which is defined for PDSCH mapping type-A, for scenarios where PDSCH mapping type-B is to be used rather than having to use network resources to receive and storage resources to store multiple TDRA tables for multiple PDSCH mapping types. Additionally, or alternatively, network node 610 may apply different PDSCH mapping types to different repetitions of a PDSCH. For example, network node 610 may apply a mapping type of a SLIV of an indicated TDRA row of a TDRA table (e.g., PDSCH mapping type-A) to a first PDSCH repetition and a statically defined PDSCH mapping type (e.g., PDSCH mapping type-B). In this way, network node 610 may partially reuse a TDRA table by statically applying PDSCH mapping type-B to some PDSCH repetitions even when a TDRA row of a TDRA table is associated with a different PDSCH mapping type.

As further shown in FIG. 6, and by reference numbers 630 and 640, network node 610 may receive transmitted PDSCHs in accordance with the control information. For example, network node 610 may receive a subset of repetitions of one or more PDSCHs (e.g., a subset of repetitions of a first PDSCH and/or a subset of repetitions of a second PDSCH) based at least in part on whether the subset of repetitions collide with a semi-static uplink symbol.

In some aspects, network node 610 may determine whether any PDSCH repetitions collide with a semi-static uplink symbol. For example, network node 610 may determine that a single repetition (or multiple repetitions), of a plurality of repetitions, of a PDSCH collides with a semi-static uplink symbol. In this case, the single repetition (or the multiple repetitions) may be a first repetition of the PDSCH and/or a subsequent repetition of the PDSCH. Additionally, or alternatively, network node 610 may determine that a plurality of repetitions of the PDSCH collide with semi-static uplink symbols.

In some aspects, network node 610 and network nodes 602-A and 602-B may treat a repetition of a PDSCH that collides with a semi-static uplink symbol as an error case (e.g., such a scenario may be considered invalid and may not be schedulable and/or may result in a change to scheduling to avoid such a scenario). For example, collisions between any repetitions of a PDSCH and any semi-static uplink symbol in a multi-PDSCH grant with intra-slot repetition scenario may be defined as error cases. In this case, network node 602-A or 602-B may forgo transmission of a colliding PDSCH repetition (e.g., may forgo any transmission or may transmit or receive another communication rather than the colliding PDSCH repetition) and network node 610 may forgo transmission of the colliding PDSCH repetition (e.g., may forgo any reception or may transmit or receive another communication rather than the colliding PDSCH repetition). Additionally, or alternatively, network node 602-A or 602-B and network node 610 may determine that the DCI scheduling the PDSCH is invalid. For example, network node 610 may discard the DCI and/or all grants of PDSCH resources thereof when the network node 610 is configured to treat a repetition of a PDSCH that collides with a semi-static uplink symbol as an error case.

In some aspects, network node 610 may determine that a PDSCH is invalid when any repetition of the PDSCH collides with a semi-static uplink symbol. For example, network node 610 may determine to forgo receiving all repetitions of the PDSCH that includes at least one repetition that collides with the semi-static uplink symbol, but network node 610 may determine to receive repetitions of other PDSCHs of the multi-PDSCH grant of the DCI. In this way, network node 610 and network nodes 602-A and 602-B increase network flexibility by allowing a DCI to include a grant of a colliding PDSCH repetition (e.g., of a first PDSCH) and remain valid with respect to at least one other PDSCH repetition (e.g., of a second PDSCH). In some aspects, network node 610 may forgo HARQ feedback for any invalid PDSCHs. For example, for a HARQ acknowledgement (ACK) (HARQ-ACK) codebook type-1, network node 610 may forgo transmitting a negative acknowledgement (NACK) for any PDSCHs that are determined to be invalid (e.g., based at least in part on having a repetition that collides with a semi-static uplink symbol).

In some aspects, network node 610 may determine whether a PDSCH is invalid based at least in part on which repetition of the PDSCH collides with a semi-static uplink symbol. For example, when a first repetition of a PDSCH collides with a semi-static uplink symbol, network node 610 may determine that a PDSCH is invalid and may forgo receiving any repetitions of the PDSCH and/or transmitting HARQ feedback for the PDSCH. Additionally, or alternatively, when a second or other subsequent repetition of the PDSCH collides with a semi-static uplink symbol, network node 610 may only determine that the second or other subsequent repetition of the PDSCH is invalid. In other words, network node 610 may receive the first repetition of the PDSCH and transmit HARQ feedback for the first repetition of the PDSCH, but may forgo reception of the second repetition of the PDSCH. In this way, network node 610 and network nodes 602-A and 602-B further improve flexibility by enabling multi-PDSCH scheduling with PDSCHs that have some repetitions that collide with semi-static uplink symbols to still have valid PDSCH repetitions.

As indicated above, FIG. 6 is provided as an example. Other examples may differ from what is described with respect to FIG. 6.

Figure 7:
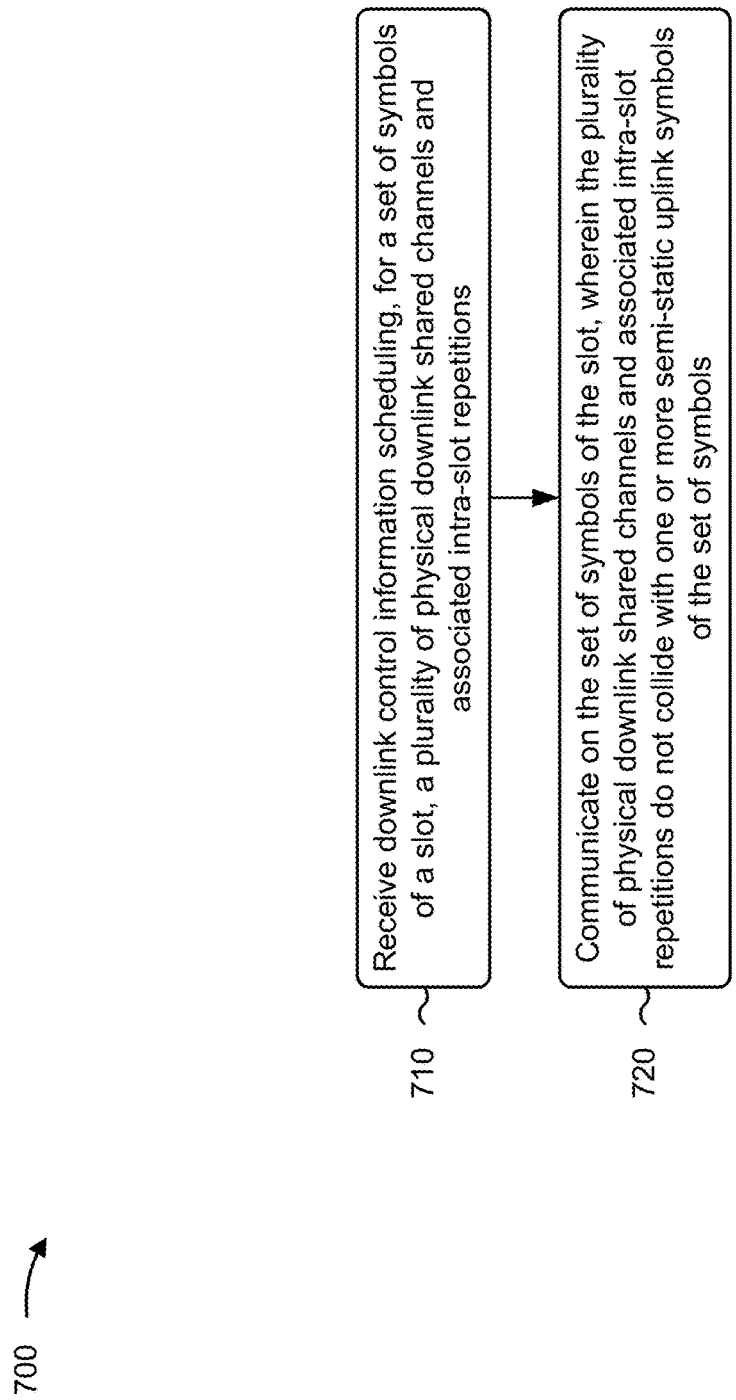
FIGS. 7-8 are diagrams illustrating example processes associated with handling of a PDSCH overlapping with a semi-static uplink symbol, in accordance with the present disclosure.

FIG. 7 is a diagram illustrating an example process 700 performed, for example, by a network node, in accordance with the present disclosure. Example process 700 is an example where the network node (e.g., network node 610 or UE 120) performs operations associated with handling of a physical downlink shared channel overlapping with a semi-static symbol.

As shown in FIG. 7, in some aspects, process 700 may include receiving downlink control information scheduling, for a set of symbols of a slot, a plurality of physical downlink shared channels and associated intra-slot repetitions (block 710). For example, the network node (e.g., using communication manager 140 and/or reception component 902, depicted in FIG. 9) may receive downlink control information scheduling, for a set of symbols of a slot, a plurality of physical downlink shared channels and associated intra-slot repetitions, as described above.

As further shown in FIG. 7, in some aspects, process 700 may include communicating on the set of symbols of the slot, wherein the plurality of physical downlink shared channels and associated intra-slot repetitions do not collide with one or more semi-static uplink symbols of the set of symbols (block 720). For example, the network node (e.g., using communication manager 140 and/or reception component 902 or transmission component 904, depicted in FIG. 9) may communicate on the set of symbols of the slot, wherein the plurality of physical downlink shared channels and associated intra-slot repetitions do not collide with one or more semi-static uplink symbols of the set of symbols, as described above.

Process 700 may include additional aspects, such as any single aspect or any combination of aspects described below and/or in connection with one or more other processes described elsewhere herein.

In a first aspect, at least one semi-static uplink symbol, of the one or more semi-static uplink symbols, is scheduled to collide with any of the plurality of physical downlink shared channels and associated intra-slot repetitions, and wherein the network node is to communicate on the set of symbols without using the downlink control information, such that the one or more semi-static uplink symbols do not collide with the plurality of physical downlink shared channels and associated intra-slot repetitions.

In a second aspect, at least one semi-static uplink symbol, of the one or more semi-static uplink symbols, is scheduled to collide with a physical downlink shared channel or associated intra-slot repetition, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

In a third aspect, process 700 includes transmitting feedback information for the remainder of the plurality of physical downlink shared channels and associated intra-slot repetitions, wherein the feedback information does not include a negative acknowledgement for the physical downlink shared channel or associated intra-slot repetition.

In a fourth aspect, at least one semi-static uplink symbol, of the one or more semi-static uplink symbols, is scheduled to collide with a first instance of a physical downlink shared channel, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

In a fifth aspect, at least one semi-static uplink symbol, of the one or more semi-static uplink symbols, is scheduled to collide with a second instance of a physical downlink shared channel, of the plurality of physical downlink shared channels and associated intra-slot repetitions, and wherein the network node is to communicate on the set of symbols using the downlink control information, including a first instance of the physical downlink shared channel and not including the second instance of the downlink shared channel, such that the network node does not receive the second instance of the physical downlink shared channel.

In a sixth aspect, process 700 includes transmitting feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel.

In a seventh aspect, the downlink control information includes a time domain resource assignment field associated with a physical downlink shared channel mapping type-B for each start and length indicator value corresponding to each physical downlink shared channel.

In an eighth aspect, the downlink control information includes a time domain resource assignment field not associated with a physical downlink shared channel mapping type-B for at least one start and length indicator value associated with at least one physical downlink shared channel or associated repetition, and wherein the network node is to use physical downlink shared channel mapping type-B for the at least one physical downlink shared channel or associated repetition.

In a ninth aspect, the downlink control information includes a time domain resource assignment field not associated with a physical downlink shared channel mapping type-B for at least one start and length indicator value associated with at least one physical downlink shared channel or associated repetition, and wherein the network node is to use a value of the time domain resource assignment field for the at least one physical downlink shared channel and to use physical downlink shared channel mapping type-B for the associated repetition.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
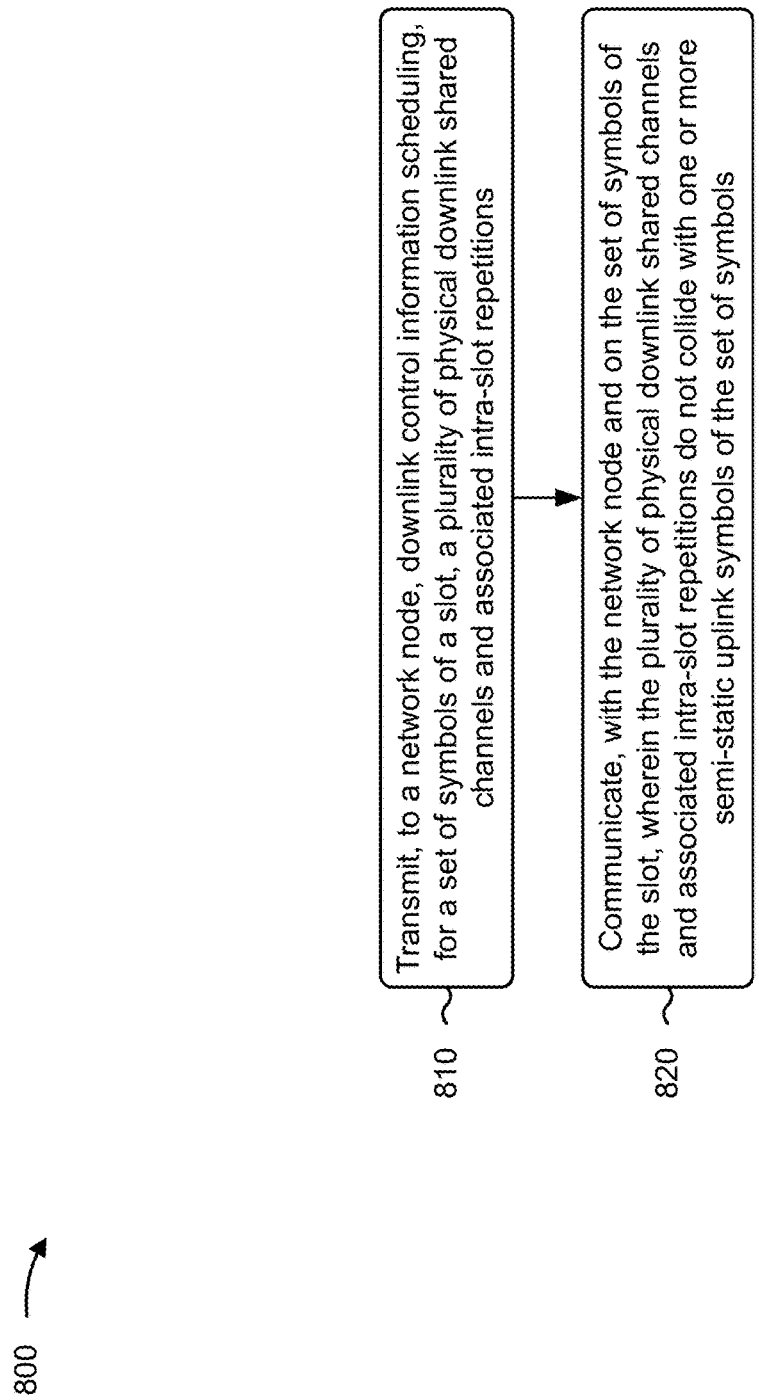

FIG. 8 is a diagram illustrating an example process 800 performed, for example, by a base station, in accordance with the present disclosure. Example process 800 is an example where the network node (e.g., base station 110, network node 602-A, or network node 602-B, among other examples) performs operations associated with handling of a PDSCH overlapping with a semi-static symbol.

As shown in FIG. 8, in some aspects, process 800 may include transmitting, to a network node, downlink control information scheduling, for a set of symbols of a slot, a plurality of physical downlink shared channels and associated intra-slot repetitions (block 810). For example, the base station (e.g., using communication manager 150 and/or transmission component 1004, depicted in FIG. 10) may transmit, to a network node, downlink control information scheduling, for a set of symbols of a slot, a plurality of physical downlink shared channels and associated intra-slot repetitions, as described above.

As further shown in FIG. 8, in some aspects, process 800 may include communicating, with the network node and on the set of symbols of the slot, wherein the plurality of physical downlink shared channels and associated intra-slot repetitions do not collide with one or more semi-static uplink symbols of the set of symbols (block 820). For example, the base station (e.g., using communication manager 150 and/or reception component 1002 or transmission component 1004, depicted in FIG. 10) may communicate, with the network node and on the set of symbols of the slot, wherein the plurality of physical downlink shared channels and associated intra-slot repetitions do not collide with one or more semi-static uplink symbols of the set of symbols, as described above.

Process 800 may include additional aspects, such as any single aspect or any combination of aspects described below and/or in connection with one or more other processes described elsewhere herein.

In a first aspect, at least one semi-static uplink symbol, of the one or more semi-static uplink symbols, is scheduled to collide with any of the plurality of physical downlink shared channels and associated intra-slot repetitions, and wherein the network node is to communicate on the set of symbols without using the downlink control information, such that the one or more semi-static uplink symbols do not collide with the plurality of physical downlink shared channels and associated intra-slot repetitions.

In a second aspect, at least one semi-static uplink symbol, of the one or more semi-static uplink symbols, is scheduled to collide with a physical downlink shared channel or associated intra-slot repetition, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

In a third aspect, process 800 includes receiving feedback information for the remainder of the plurality of physical downlink shared channels and associated intra-slot repetitions, wherein the feedback information does not include a negative acknowledgement for the physical downlink shared channel or associated intra-slot repetition.

In a fourth aspect, at least one semi-static uplink symbol, of the one or more semi-static uplink symbols, is scheduled to collide with a first instance of a physical downlink shared channel, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

In a fifth aspect, at least one semi-static uplink symbol, of the one or more semi-static uplink symbols, is scheduled to collide with a second instance of a physical downlink shared channel, of the plurality of physical downlink shared channels and associated intra-slot repetitions, and wherein the network node is to communicate on the set of symbols using the downlink control information, including a first instance of the physical downlink shared channel and not including the second instance of the downlink shared channel, such that the network node does not receive the second instance of the physical downlink shared channel.

In a sixth aspect, process 800 includes receiving feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel.

In a seventh aspect, the downlink control information includes a time domain resource assignment field associated with a physical downlink shared channel mapping type-B for each start and length indicator value corresponding to each physical downlink shared channel.

In an eighth aspect, the downlink control information includes a time domain resource assignment field not associated with a physical downlink shared channel mapping type-B for at least one start and length indicator value associated with at least one physical downlink shared channel or associated repetition, and wherein the network node is to use physical downlink shared channel mapping type-B for the at least one physical downlink shared channel or associated repetition.

In a ninth aspect, the downlink control information includes a time domain resource assignment field not associated with a physical downlink shared channel mapping type-B for at least one start and length indicator value associated with at least one physical downlink shared channel or associated repetition, and wherein the network node is to use a value of the time domain resource assignment field for the at least one physical downlink shared channel and to use physical downlink shared channel mapping type-B for the associated repetition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
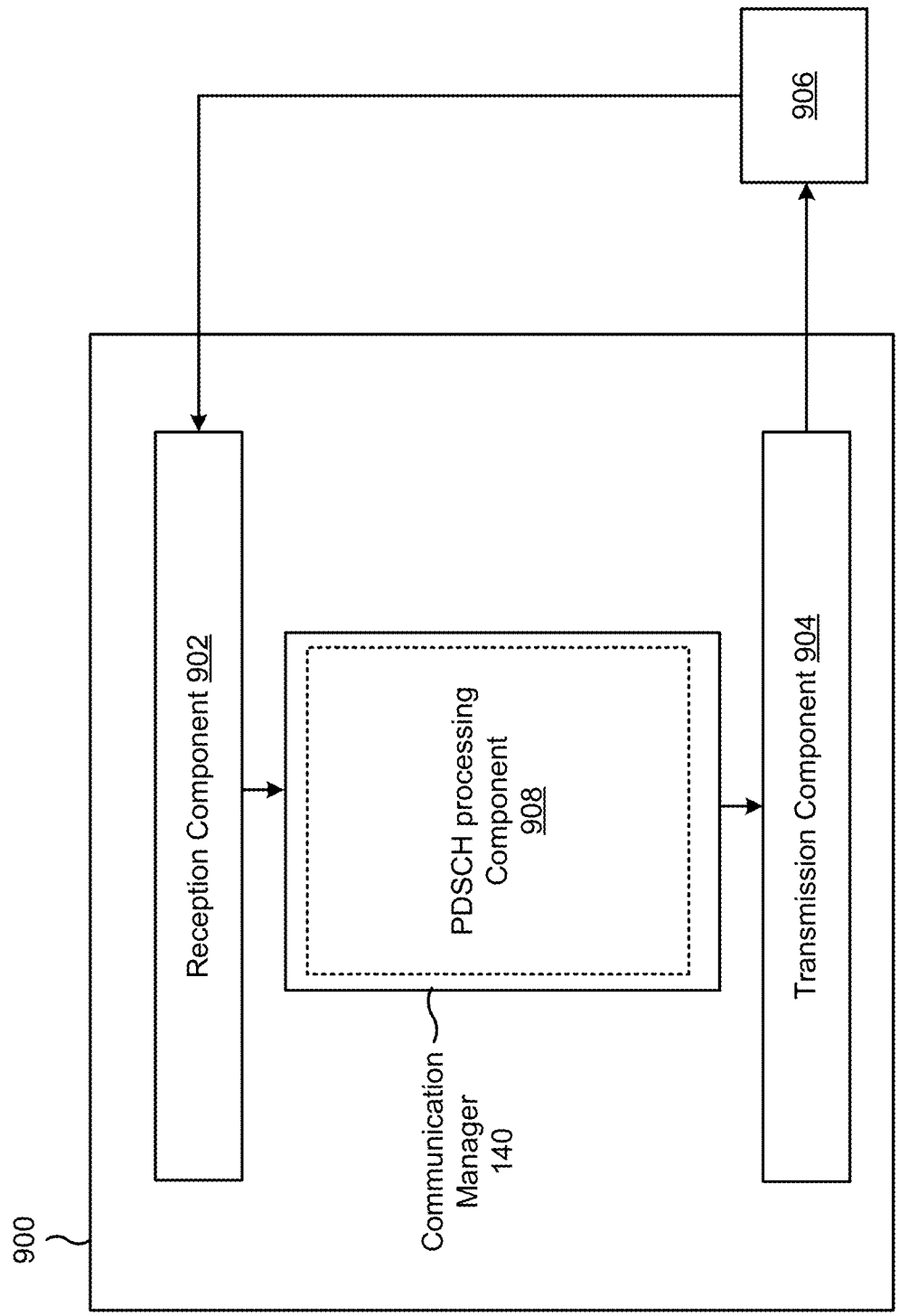
FIGS. 9-10 are diagrams of example apparatuses for wireless communication, in accordance with the present disclosure.

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, a network node, or another wireless communication device) using the reception component 902 and the transmission component 904. As further shown, the apparatus 900 may include the communication manager 140. The communication manager 140 may include a PDSCH processing component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7 or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The reception component 902 may receive downlink control information scheduling, for a set of symbols of a slot, a plurality of physical downlink shared channels and associated intra-slot repetitions. The reception component 902 or the transmission component 904 may communicate on the set of symbols of the slot, wherein the plurality of physical downlink shared channels and associated intra-slot repetitions do not collide with one or more semi-static uplink symbols of the set of symbols. For example, the reception component 902 may receive valid PDSCH repetitions and the transmission component 904 may transmit on semi-static uplink symbols based at least in part on the reception component 902 dropping reception of invalid PDSCH repetitions.

The transmission component 904 may transmit feedback information for the remainder of the plurality of physical downlink shared channels and associated intra-slot repetitions, wherein the feedback information does not include a negative acknowledgement for the physical downlink shared channel or associated intra-slot repetition.

The transmission component 904 may transmit feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel. The PDSCH processing component 908 may process a multi-PDSCH grant to determine whether a PDSCH or an instance of a repetition thereof is valid or invalid.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
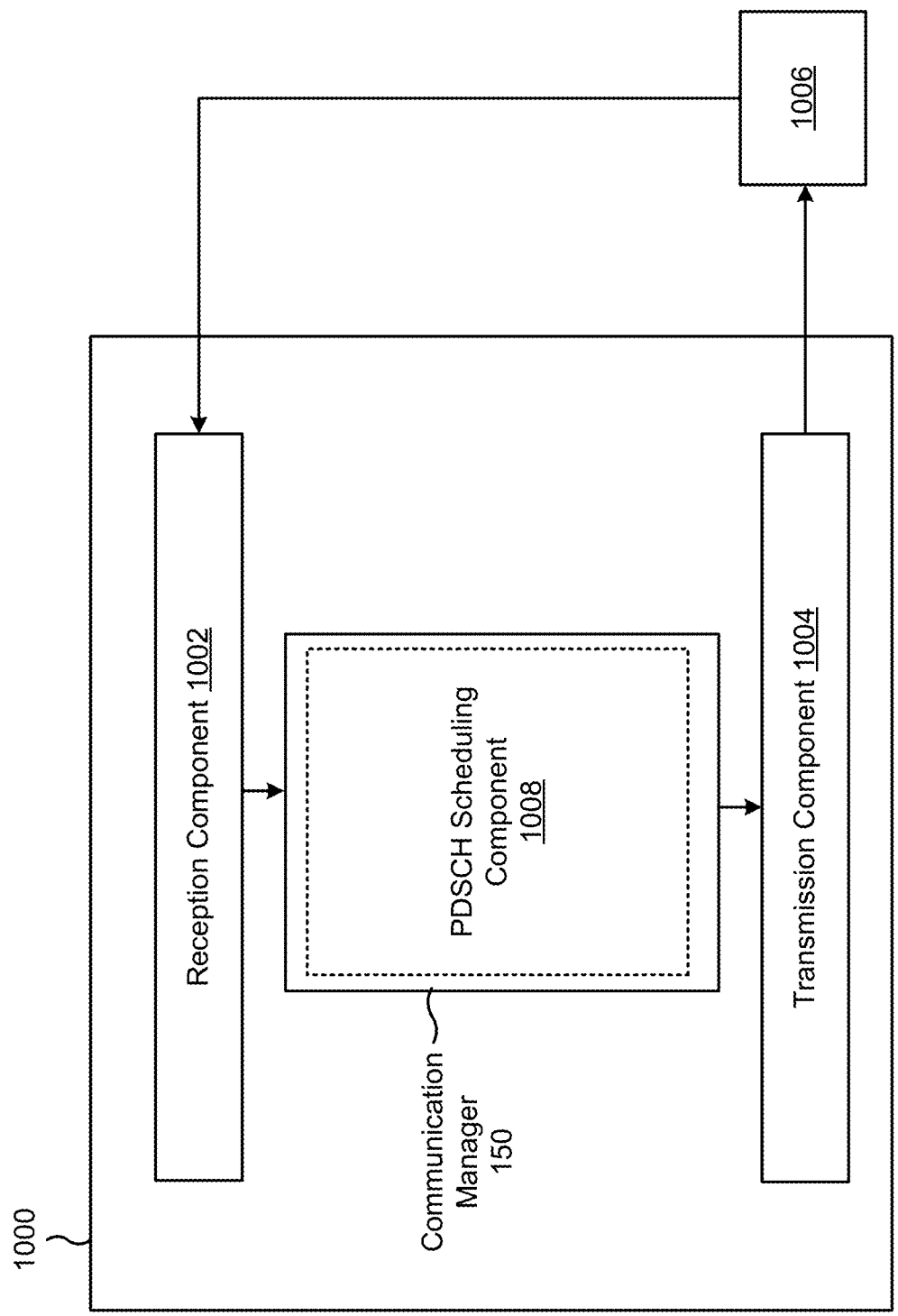

FIG. 10 is a diagram of an example apparatus 1000 for wireless communication. The apparatus 1000 may be a base station, or a base station may include the apparatus 1000. In some aspects, the apparatus 1000 may be a network node, such as a base station or a component of a base station (e.g., a component of a disaggregated base station), among other examples. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, a network node or another wireless communication device) using the reception component 1002 and the transmission component 1004. As further shown, the apparatus 1000 may include the communication manager 150. The communication manager 150 may include a PDSCH scheduling component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8 or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a network node, downlink control information scheduling, for a set of symbols of a slot, a plurality of physical downlink shared channels and associated intra-slot repetitions. The reception component 1002 or the transmission component 1004 may communicate, with the network node and on the set of symbols of the slot, wherein the plurality of physical downlink shared channels and associated intra-slot repetitions do not collide with one or more semi-static uplink symbols of the set of symbols. For example, the reception component 1002 may receive on a resource for which a scheduled PDSCH is determined to be invalid or transmission component 1004 may transmit an invalid PDSCH or cancel transmission of the invalid PDSCH to transmit another communication on a resource for which a scheduled PDSCH is determined to be invalid.

The reception component 1002 may receive feedback information for the remainder of the plurality of physical downlink shared channels and associated intra-slot repetitions, wherein the feedback information does not include a negative acknowledgement for the physical downlink shared channel or associated intra-slot repetition. The reception component 1002 may receive feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel. The PDSCH scheduling component 1008 may schedule a multi-PDSCH grant and/or determine whether one or more PDSCH repetitions thereof are valid or invalid.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
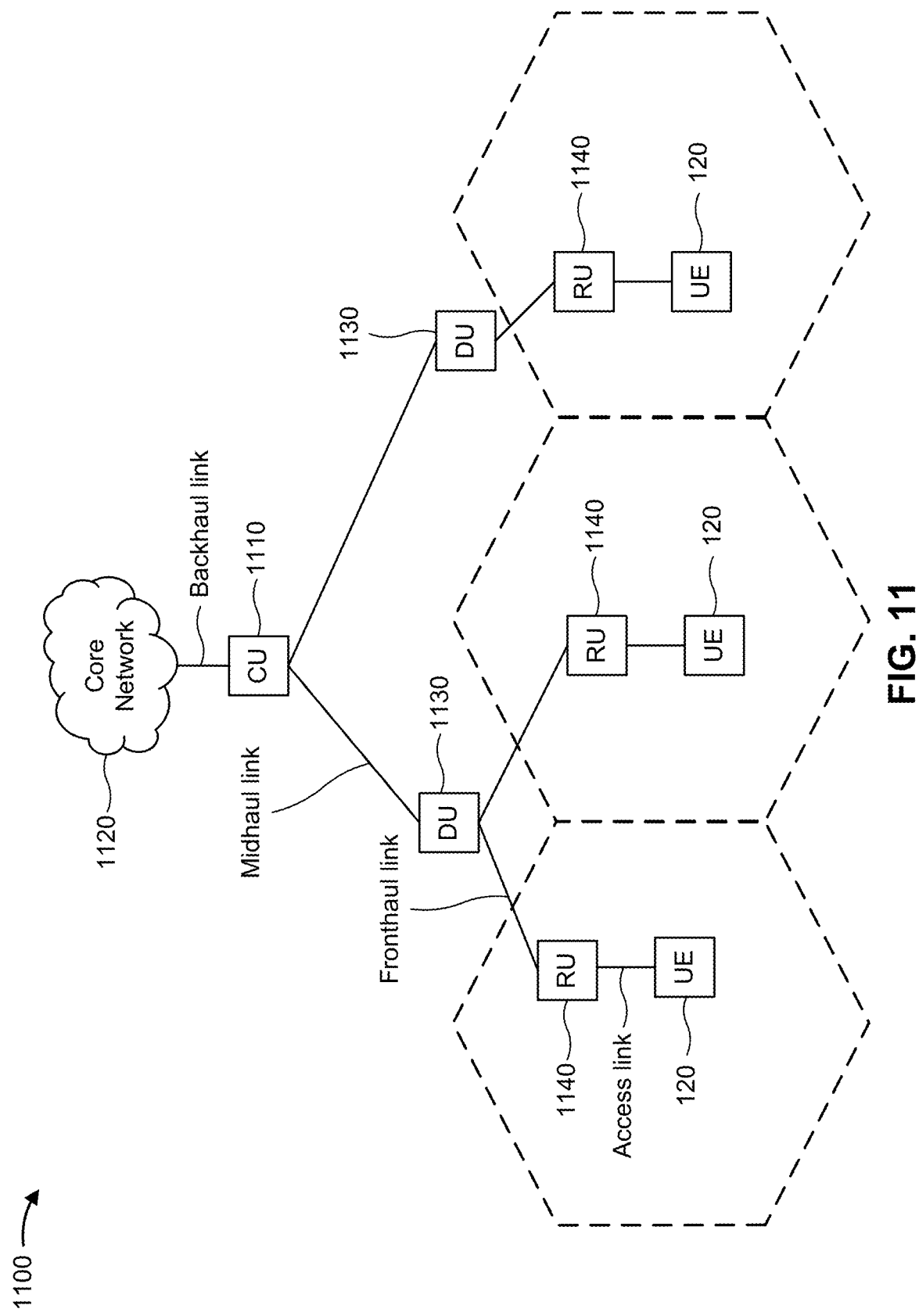
FIG. 11 is a diagram of an open radio access network (O-RAN) architecture, in accordance with the present disclosure.

FIG. 11 is a diagram illustrating an example 1100 of an O-RAN architecture, in accordance with the present disclosure. As shown in FIG. 11, the O-RAN architecture may include a CU 1110 that communicates with a core network 1120 via a backhaul link. Furthermore, the CU 1110 may communicate with one or more DUs 1130 via respective midhaul links. The DUs 1130 may each communicate with one or more RUs 1140 via respective fronthaul links, and the RUs 1140 may each communicate with respective UEs 120 via radio frequency (RF) access links. The DUs 1130 and the RUs 1140 may also be referred to as O-RAN DUs (O-DUs) 1130 and O-RAN RUs (O-RUs) 1140, respectively. One or more of the components of the O-RAN architecture may correspond to, include, or be included in the UE 120, the base station 110, the network node 610, the network node 602-A, the network node 602-B, the apparatus 900, or the apparatus 1000, among other examples.

In some aspects, the DUs 1130 and the RUs 1140 may be implemented according to a functional split architecture in which functionality of a base station 110 (e.g., an eNB or a gNB) is provided by a DU 1130 and one or more RUs 1140 that communicate over a fronthaul link. Accordingly, as described herein, a base station 110 may include a DU 1130 and one or more RUs 1140 that may be co-located or geographically distributed. In some aspects, the DU 1130 and the associated RU(s) 1140 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1130 may correspond to a logical unit that includes one or more base station functions to control the operation of one or more RUs 1140. For example, in some aspects, the DU 1130 may host an RLC layer, a MAC layer, and one or more high physical (PHY) layers (e.g., forward error correction (FEC) encoding and decoding, scrambling, and/or modulation and demodulation) based at least in part on a lower layer functional split. Higher layer control functions, such as a PDCP, RRC, and/or service data adaptation protocol (SDAP), may be hosted by the CU 1110. The RU(s) 1140 controlled by a DU 1130 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 1140 handle all over the air (OTA) communication with a UE 120, and real-time and non-real-time aspects of control and user plane communication with the RU(s) 1140 are controlled by the corresponding DU 1130, which enables the DU(s) 1130 and the CU 1110 to be implemented in a cloud-based RAN architecture.

As indicated above, FIG. 11 is provided as an example. Other examples may differ from what is described with regard to FIG. 11.

The following provides an overview of some Aspects of the present disclosure:

Aspect 1: A method of wireless communication performed by a network node, comprising: receiving downlink control information scheduling, for a set of symbols of a slot, a plurality of physical downlink shared channels and associated intra-slot repetitions; and communicating on the set of symbols of the slot, wherein the plurality of physical downlink shared channels and associated intra-slot repetitions do not collide with one or more semi-static uplink symbols of the set of symbols.

Aspect 2: The method of Aspect 1, wherein at least one semi-static uplink symbol, of the one or more semi-static uplink symbols, is scheduled to collide with any of the plurality of physical downlink shared channels and associated intra-slot repetitions, and wherein the network node is to communicate on the set of symbols without using the downlink control information, such that the one or more semi-static uplink symbols do not collide with the plurality of physical downlink shared channels and associated intra-slot repetitions.

Aspect 3: The method of any of Aspects 1 to 2, wherein at least one semi-static uplink symbol, of the one or more semi-static uplink symbols, is scheduled to collide with a physical downlink shared channel or associated intra-slot repetition, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

Aspect 4: The method of Aspect 3, further comprising: transmitting feedback information for the remainder of the plurality of physical downlink shared channels and associated intra-slot repetitions, wherein the feedback information does not include a negative acknowledgement for the physical downlink shared channel or associated intra-slot repetition.

Aspect 5: The method of any of Aspects 1 to 4, wherein at least one semi-static uplink symbol, of the one or more semi-static uplink symbols, is scheduled to collide with a first instance of a physical downlink shared channel, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

Aspect 6: The method of any of Aspects 1 to 5, wherein at least one semi-static uplink symbol, of the one or more semi-static uplink symbols, is scheduled to collide with a second instance of a physical downlink shared channel, of the plurality of physical downlink shared channels and associated intra-slot repetitions, and wherein the network node is to communicate on the set of symbols using the downlink control information, including a first instance of the physical downlink shared channel and not including the second instance of the downlink shared channel, such that the network node does not receive the second instance of the physical downlink shared channel.

Aspect 7: The method of Aspect 6, further comprising: transmitting feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel.

Aspect 8: The method of any of Aspects 1 to 7, wherein the downlink control information includes a time domain resource assignment field associated with a physical downlink shared channel mapping type-B for each start and length indicator value corresponding to each physical downlink shared channel.

Aspect 9: The method of any of Aspects 1 to 8, wherein the downlink control information includes a time domain resource assignment field not associated with a physical downlink shared channel mapping type-B for at least one start and length indicator value associated with at least one physical downlink shared channel or associated repetition, and wherein the network node is to use physical downlink shared channel mapping type-B for the at least one physical downlink shared channel or associated repetition.

Aspect 10: The method of any of Aspects 1 to 9, wherein the downlink control information includes a time domain resource assignment field not associated with a physical downlink shared channel mapping type-B for at least one start and length indicator value associated with at least one physical downlink shared channel or associated repetition, and wherein the network node is to use a value of the time domain resource assignment field for the at least one physical downlink shared channel and to use physical downlink shared channel mapping type-B for the associated repetition.

Aspect 11: A method of wireless communication performed by a base station, comprising: transmitting, to a network node, downlink control information scheduling, for a set of symbols of a slot, a plurality of physical downlink shared channels and associated intra-slot repetitions; and communicating, with the network node and on the set of symbols of the slot, wherein the plurality of physical downlink shared channels and associated intra-slot repetitions do not collide with one or more semi-static uplink symbols of the set of symbols.

Aspect 12: The method of Aspect 11, wherein at least one semi-static uplink symbol, of the one or more semi-static uplink symbols, is scheduled to collide with any of the plurality of physical downlink shared channels and associated intra-slot repetitions, and wherein the network node is to communicate on the set of symbols without using the downlink control information, such that the one or more semi-static uplink symbols do not collide with the plurality of physical downlink shared channels and associated intra-slot repetitions.

Aspect 13: The method of any of Aspects 11 to 12, wherein at least one semi-static uplink symbol, of the one or more semi-static uplink symbols, is scheduled to collide with a physical downlink shared channel or associated intra-slot repetition, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

Aspect 14: The method of Aspect 13, further comprising: receiving feedback information for the remainder of the plurality of physical downlink shared channels and associated intra-slot repetitions, wherein the feedback information does not include a negative acknowledgement for the physical downlink shared channel or associated intra-slot repetition.

Aspect 15: The method of any of Aspects 11 to 14, wherein at least one semi-static uplink symbol, of the one or more semi-static uplink symbols, is scheduled to collide with a first instance of a physical downlink shared channel, of the plurality of physical downlink shared channels and associated intra-slot repetitions, and wherein the network node is to communicate on the set of symbols using the downlink control information except for a grant of the physical downlink shared channel, such that the one or more semi-static uplink symbols do not collide with a remainder of the plurality of physical downlink shared channels and associated intra-slot repetitions.

Aspect 16: The method of any of Aspects 11 to 15, wherein at least one semi-static uplink symbol, of the one or more semi-static uplink symbols, is scheduled to collide with a second instance of a physical downlink shared channel, of the plurality of physical downlink shared channels and associated intra-slot repetitions, and wherein the network node is to communicate on the set of symbols using the downlink control information, including a first instance of the physical downlink shared channel and not including the second instance of the downlink shared channel, such that the network node does not receive the second instance of the physical downlink shared channel.

Aspect 17: The method of Aspect 16, further comprising: receiving feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel.

Aspect 18: The method of any of Aspects 11 to 17, wherein the downlink control information includes a time domain resource assignment field associated with a physical downlink shared channel mapping type-B for each start and length indicator value corresponding to each physical downlink shared channel.

Aspect 19: The method of any of Aspects 11 to 18, wherein the downlink control information includes a time domain resource assignment field not associated with a physical downlink shared channel mapping type-B for at least one start and length indicator value associated with at least one physical downlink shared channel or associated repetition, and wherein the network node is to use physical downlink shared channel mapping type-B for the at least one physical downlink shared channel or associated repetition.

Aspect 20: The method of any of Aspects 11 to 19, wherein the downlink control information includes a time domain resource assignment field not associated with a physical downlink shared channel mapping type-B for at least one start and length indicator value associated with at least one physical downlink shared channel or associated repetition, and wherein the network node is to use a value of the time domain resource assignment field for the at least one physical downlink shared channel and to use physical downlink shared channel mapping type-B for the associated repetition.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
    a memory; and
    one or more processors, coupled to the memory, configured to:
        receive downlink control information scheduling, for a set of symbols of a slot, a plurality of physical downlink shared channels (PDSCHs) and associated intra-slot repetitions, wherein the downlink control information comprises a multi-PDSCH grant for the plurality of PDSCHs, and wherein at least one semi-static uplink symbol of the set of symbols is scheduled to collide with a physical downlink shared channel or associated intra-slot repetition of the plurality of physical downlink shared channels and associated intra-slot repetitions; and
        communicate on the set of symbols of the slot using the downlink control information except for a grant of the physical downlink shared channel, such that one or more semi-static uplink symbols of the set of symbols do not collide with a remainder of the plurality of physical downlink shared channels and associated intra-slot repetitions.

2. The network node of claim 1, wherein the one or more processors are further configured to:
    transmit feedback information for the remainder of the plurality of physical downlink shared channels and associated intra-slot repetitions, wherein the feedback information does not include a negative acknowledgement for the physical downlink shared channel or associated intra-slot repetition.

3. The network node of claim 1, wherein the at least one semi-static uplink symbol is scheduled to collide with a first instance of the physical downlink shared channel.

4. The network node of claim 1, wherein the at least one semi-static uplink symbol is scheduled to collide with a second instance of the physical downlink shared channel, and
    wherein the network node is to communicate on the set of symbols using the downlink control information, including a first instance of the physical downlink shared channel and not including the second instance of the physical downlink shared channel, such that the network node does not receive the second instance of the physical downlink shared channel.

5. The network node of claim 4, wherein the one or more processors are further configured to:
    transmit feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel.

6. The network node of claim 1, wherein the downlink control information includes a time domain resource assignment field associated with a physical downlink shared channel mapping type-B for each start and length indicator value corresponding to each physical downlink shared channel.

7. The network node of claim 1, wherein the downlink control information includes a time domain resource assignment field not associated with a physical downlink shared channel mapping type-B for at least one start and length indicator value associated with at least one physical downlink shared channel or associated repetition, and
    wherein the network node is to use physical downlink shared channel mapping type-B for the at least one physical downlink shared channel or associated repetition.

8. The network node of claim 1, wherein the downlink control information includes a time domain resource assignment field not associated with a physical downlink shared channel mapping type-B for at least one start and length indicator value associated with at least one physical downlink shared channel or associated repetition, and
    wherein the network node is to use a value of the time domain resource assignment field for the at least one physical downlink shared channel and to use physical downlink shared channel mapping type-B for the associated repetition.

9. The network node of claim 1, wherein the multi-PDSCH grant schedules at least a first PDSCH and a second PDSCH of the plurality of PDSCHs, wherein the plurality of associated intra-slot repetitions include at least a repetition of the first PDSCH and a repetition of the second PDSCH, wherein the first PDSCH or the repetition of the first PDSCH has a scheduled collision with the at least one semi-static uplink symbol.

10. The network node of claim 9, wherein the one or more processors are configured to communicate on the set of symbols using the downlink control information except for the grant of the physical downlink shared channel by being configured to receive the second PDSCH of the multi-PDSCH grant and not receive the first PDSCH of the multi-PDSCH grant based on the scheduled collision associated with the first PDSCH.

11. The network node of claim 10, wherein the one or more processors are further configured to skip incrementing a hybrid automatic repeat request (HARD) process number associated with the first PDSCH based on the scheduled collision associated with the first PDSCH.

12. A base station for wireless communication, comprising:
    a memory; and
    one or more processors, coupled to the memory, configured to:
        transmit, to a network node, downlink control information scheduling, for a set of symbols of a slot, a plurality of physical downlink shared channels (PDSCHs) and associated intra-slot repetitions, wherein the downlink control information comprises a multi-PDSCH grant for the plurality of PDSCHs, and wherein at least one semi-static uplink symbol of the set of symbols is scheduled to collide with a physical downlink shared channel or associated intra-slot repetition of the plurality of physical downlink shared channels and associated intra-slot repetitions; and communicate, with the network node and on the set of symbols of the slot using the downlink control information except for a grant of the physical downlink shared channel, such that one or more semi-static uplink symbols of the set of symbols do not collide with a remainder of the plurality of physical downlink shared channels and associated intra-slot repetitions.

13. The base station of claim 12, wherein the one or more processors are further configured to:

receive feedback information for the remainder of the plurality of physical downlink shared channels and associated intra-slot repetitions, wherein the feedback information does not include a negative acknowledgement for the physical downlink shared channel or associated intra-slot repetition.

14. The base station of claim 12, wherein the at least one semi-static uplink symbol is scheduled to collide with a first instance of the physical downlink shared channel.

15. The base station of claim 12, wherein the at least one semi-static uplink symbol is scheduled to collide with a second instance of the physical downlink shared channel, and wherein the based station is to communicate on the set of symbols using the downlink control information, including a first instance of the physical downlink shared channel and not including the second instance of the downlink shared channel, such that the network node does not receive the second instance of the physical downlink shared channel.

16. The base station of claim 15, wherein the one or more processors are further configured to:

receive feedback information for a portion of the plurality of physical downlink shared channels and associated intra-slot repetitions, wherein the feedback information includes feedback information for the first instance of the physical downlink shared channel and does not include a negative acknowledgement for the second instance of the physical downlink shared channel.

17. The base station of claim 12, wherein the downlink control information includes a time domain resource assignment field associated with a physical downlink shared channel mapping type-B for each start and length indicator value corresponding to each physical downlink shared channel.

18. The base station of claim 12, wherein the downlink control information includes a time domain resource assignment field not associated with a physical downlink shared channel mapping type-B for at least one start and length indicator value associated with at least one physical downlink shared channel or associated repetition, and wherein the network node is to use physical downlink shared channel mapping type-B for the at least one physical downlink shared channel or associated repetition.

19. The base station of claim 12, wherein the downlink control information includes a time domain resource assignment field not associated with a physical downlink shared channel mapping type-B for at least one start and length indicator value associated with at least one physical downlink shared channel or associated repetition, and wherein the network node is to use a value of the time domain resource assignment field for the at least one physical downlink shared channel and to use physical downlink shared channel mapping type-B for the associated repetition.

20. The base station of claim 12, wherein the multi-PDSCH grant schedules at least a first PDSCH and a second PDSCH of the plurality of PDSCHs, wherein the plurality of associated intra-slot repetitions include at least a repetition of the first PDSCH and a repetition of the second PDSCH, wherein the first PDSCH or the repetition of the first PDSCH has a scheduled collision with the at least one semi-static uplink symbol.

21. A method of wireless communication performed by a network node, comprising:

receiving downlink control information scheduling, for a set of symbols of a slot, a plurality of physical downlink shared channels (PDSCHs) and associated intra-slot repetitions, wherein the downlink control information comprises a multi-PDSCH grant for the plurality of PDSCHs, and wherein at least one semi-static uplink symbol of the set of symbols is scheduled to collide with a physical downlink shared channel or associated intra-slot repetition of the plurality of physical downlink shared channels and associated intra-slot repetitions; and communicating on the set of symbols of the slot using the downlink control information except for a grant of the physical downlink shared channel, such that one or more semi-static uplink symbols of the set of symbols do not collide with a remainder of the plurality of physical downlink shared channels and associated intra-slot repetitions.

22. The method of claim 21, further comprising:

transmitting feedback information for the remainder of the plurality of physical downlink shared channels and associated intra-slot repetitions, wherein the feedback information does not include a negative acknowledgement for the physical downlink shared channel or associated intra-slot repetition.

23. The method of claim 21, wherein at the least one semi-static uplink symbol is scheduled to collide with a second instance of the physical downlink shared channel, and wherein communicating comprises communicating on the set of symbols using the downlink control information, including a first instance of the physical downlink shared channel and not including the second instance of the physical downlink shared channel, such that the network node does not receive the second instance of the physical downlink shared channel.

24. A method of wireless communication performed by a base station, comprising:

transmitting, to a network node, downlink control information scheduling, for a set of symbols of a slot, a plurality of physical downlink shared channels and associated intra-slot repetitions, wherein the downlink control information comprises a multi-PDSCH grant for the plurality of PDSCHs, and wherein at least one semi-static uplink symbol of the set of symbols is scheduled to collide with a physical downlink shared channel or associated intra-slot repetition of the plurality of physical downlink shared channels and associated intra-slot repetitions; and communicating, with the network node and on the set of symbols of the slot using the downlink control information except for a grant of the physical downlink shared channel, such that one or more semi-static uplink symbols of the set of symbols do not collide with a remainder of the plurality of physical downlink shared channels and associated intra-slot repetitions.

25. The method of claim 24, further comprising:
receiving feedback information for the remainder of the plurality of physical downlink shared channels and associated intra-slot repetitions, wherein the feedback information does not include a negative acknowledgement for the physical downlink shared channel or associated intra-slot repetition.

26. The method of claim 24, wherein the at least one semi-static uplink symbol is scheduled to collide with a second instance of the physical downlink shared channel, and
wherein communicating comprises communicating on the set of symbols using the downlink control information, including a first instance of the physical downlink shared channel and not including the second instance of the physical downlink shared channel, such that the network node does not receive the second instance of the physical downlink shared channel.

* * * * *